United States Patent [19]

Kurihara

[11] Patent Number: 4,920,347
[45] Date of Patent: Apr. 24, 1990

[54] PULSE DOPPLER RADAR SYSTEM
[75] Inventor: Noboru Kurihara, Kanagawa, Japan
[73] Assignee: Mitsubishi Denki Kabushiki Kaisha, Tokyo, Japan
[21] Appl. No.: 337,182
[22] Filed: Apr. 12, 1989
[30] Foreign Application Priority Data
  May 7, 1988 [JP] Japan ............................... 63-167314
  Jul. 11, 1988 [JP] Japan ............................... 63-172206
[51] Int. Cl.⁵ ............................................. G01S 13/34
[52] U.S. Cl. .................................... 342/130; 342/128; 342/192
[58] Field of Search ............... 342/112, 127, 128, 129, 342/130, 131, 132, 192, 195

[56] References Cited
U.S. PATENT DOCUMENTS
  3,149,326  9/1964  Naidich ........................... 342/128 X
  3,889,261  6/1975  Sirven .............................. 342/131 X
  4,536,764  8/1985  Freeman .......................... 342/192 X OTHER PUBLICATIONS
Skolnik, "Radar Handbook", pp. 16-25–16-26, 1970, McGraw Hill.

Primary Examiner—Thomas H. Tarcza
Assistant Examiner—Gilberto Barrón, Jr.
Attorney, Agent, or Firm—Wolf, Greenfield & Sacks

[57] ABSTRACT

A pulse doppler radar system for measuring the range to a target. The radar system alternately transmits a signal having a constant frequency and a signal modulated by a linearly-changing-frequency and receives an echo signal from a target. When a plurality of doppler frequencies derived from jet engine modulation are detected in the echo signal, the radar system is operable to obtain the number of frequency differences giving the same range value on the basis of the differences between the detected doppler frequencies, or to selectively use methods of range calculation according to the number of detected doppler frequencies.

12 Claims, 9 Drawing Sheets

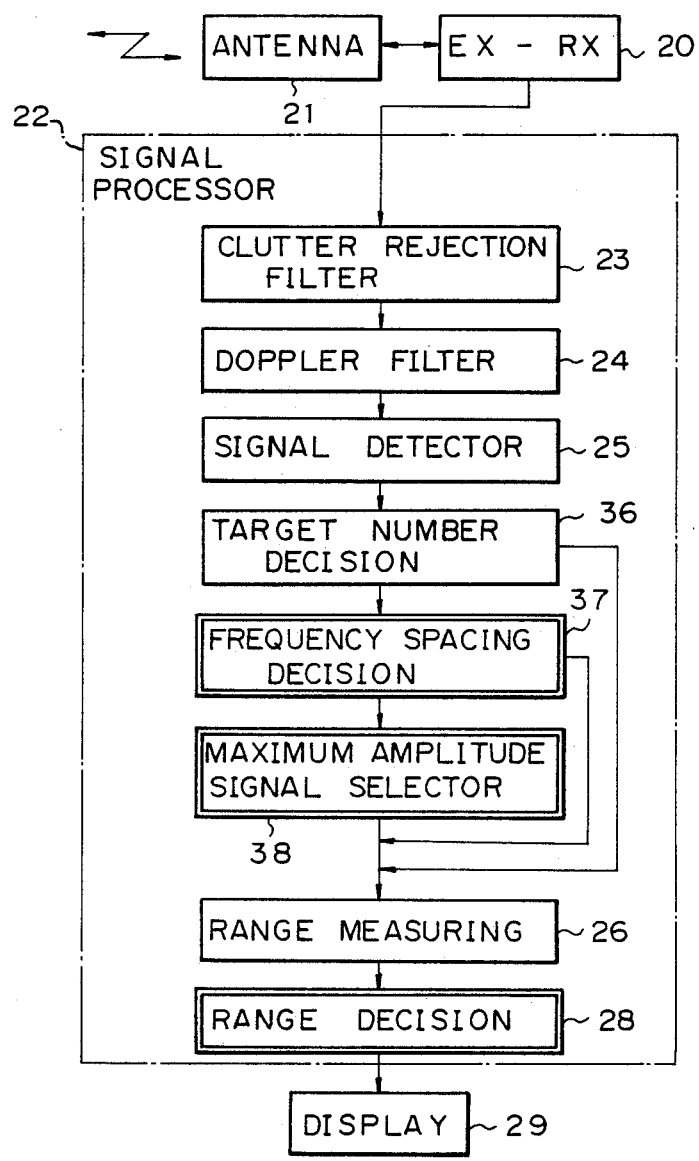

FIG. 10A
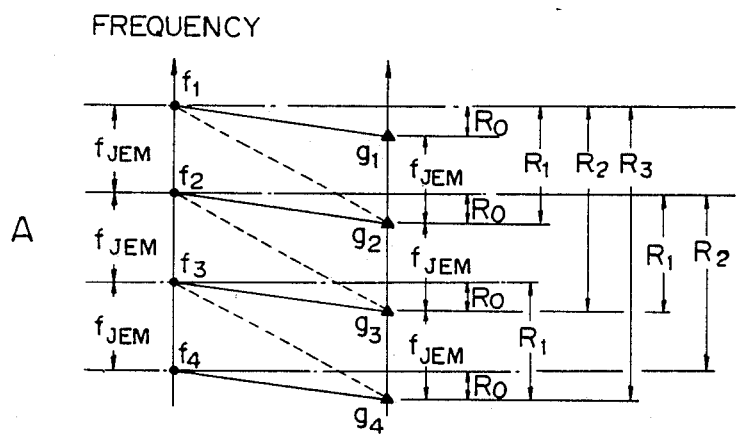
A
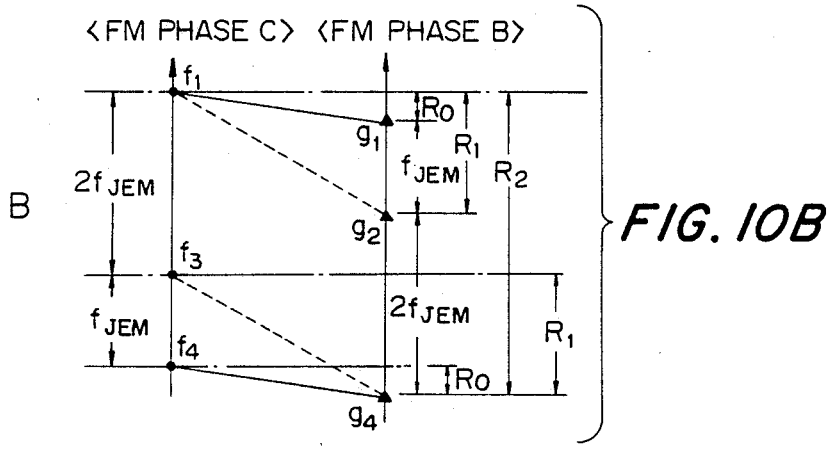
B
FIG. 10B
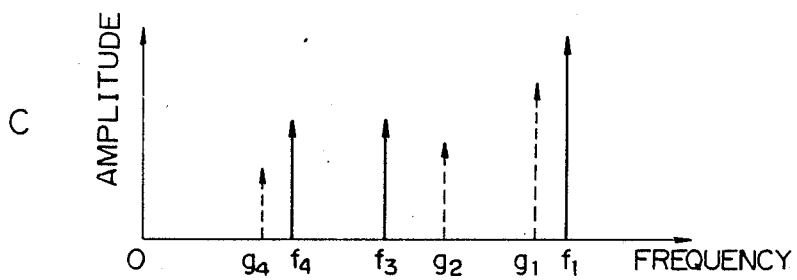
C
FIG. 10C

PULSE DOPPLER RADAR SYSTEM

BACKGROUND OF THE INVENTION

1. Field of the Invention

The present invention relates to pulse doppler radar systems for measuring a distance to a target airplane by using a frequency modulation technique.

2. Description of the Prior Art

Radar systems for measuring a range to a target airplane by means of a transmitted wave which is frequency-modulated by a pulse frequency at a high repetition rate are well known. Such a radar system comprises: an exciter-receiver for alternately generating a linearly-changing-frequency modulated transmission signal so as to pulse-modulate the transmission signal at a high repetition rate to transmit the pulse-modulated wave from an antenna and for receiving an echo signal reflected by a target to amplify the received echo signal for eliminating clutter noises and to convert the signal to a digital signal, said antenna amplifying the transmission signal to transmit it into the atmosphere and receiving the echo signal reflected from the target; and a signal processing unit for receiving the digital signal from the exciter-receiver to effect various steps of processing of the digital signal to obtain a value indicating the range to the target.

The transmission signals from the exciter-receiver include repetition of a set of signals consisting of a constant-frequency portion and a linearly-changing-frequency modulated portion and are pulse-modulated at a high repetition rate for transmission from the antenna. The antenna amplifies the pulse-modulated signals to provide high power signals which are in turn delivered to a multiplicity of antenna elements (not shown). The antenna elements add predetermined phase shifts to the signals and transmit them into the atmosphere so as to form antenna beams that are steered electronically for the purpose of searching for targets. An echo signal from a target is received by the antenna with clutter noises.

FIG. 1 shows the positional relationship between a target and a radar system mounted on a flying body. In this figure, the reference numeral 1 designates a radar system; 2 the main beam of the antenna; 3 the side lobes; 4 a target; and 5 the ground. In the case where radar system 1 is moved at the speed $V_I$ and searches target 4 in a down-look condition, radar system 1 receives unnecessary clutter noises because main beam 2 and side lobes 3 illuminate the ground. The signal from target 4 received by main beam 2 includes a plurality of doppler frequencies due to modulation caused by rotation of the jet engine compressor blades of target 4.

FIG. 2 is used to explain how planar waves input to the jet engine compressor blades are subject to the doppler shift in the negative direction. In this figure, reference numeral 6 designates the blades, and target 4 is assumed to be flying in the direction shown by arrows A opposite to the direction of propagation of the planar waves shown by arrow B. Since blades 6 rotate in the direction shown by arrow C such that the blades 6 would move away in the direction opposite to direction A from the illuminating plane of the planar waves, the doppler shift tends to become low. In addition, such factors as complicated shapes and differences in the angles of inclination and speed of rotation of the blades 6 result in the generation of subharmonic components of the modulated wave.

More specifically, the wave now impinging at point $P_1$ on the blades 6 will impinge at point $P_2$ on the blades 6 after a short period during which the blades 6 rotate through a small angle. Accordingly, blades 6 act as if to move away from the radar system 1 even though the target 4 is approaching it. As a result, a plurality of doppler frequencies lower than the doppler frequency based on the relative speed $V_R$ between target 4 and radar system 1 are produced.

The doppler frequency produced by a target airplane flying at the speed $V_T$ is expressed by the following equation:

$$f_1 = \frac{2f_0}{C_0}(V_I + V_T)\cos\theta \quad (1)$$

wherein $f_o$ indicates a transmission frequency; $C_o$ the light velocity; and $\theta$ the angle between the speed vector $V_I$ and the antenna beam.

Assuming that the amount of frequency shift due to jet engine modulation is indicated by $f_{JEM}$, the plurality of doppler frequencies are expressed as follows:

$$f_2 = f_1 - f_{JEM} = \frac{2f_0}{C_0}(V_I + V_T)\cos\theta - f_{JEM} \quad (2)$$

$$f_3 = f_1 - 2f_{JEM} = \frac{2f_0}{C_0}(V_I + V_T)\cos\theta - 2f_{JEM} \quad (3)$$

$$f_4 = f_1 - 3f_{JEM} = \frac{2f_0}{C_0}(V_I + V_T)\cos\theta - 3f_{JEM} \quad (4)$$

$$f_K = f_1 - (k-1)f_{JEM} = \quad (5)$$
$$\frac{2f_0}{C_0}(V_I + V_T)\cos\theta - (k-1)f_{JEM}$$

FIG. 3 shows a frequency spectrum of the clutter noises and the echo signal received by the radar system in the condition shown in FIG. 1. In that figure, reference numeral 7 designates main beam clutters; 8 side lobe clutters; 9 the target doppler frequency signal; and 10 doppler signals due to jet engine modulation. The received echo signal includes the real doppler frequency signal 9 determined by the speed relative to the target and given by equation (1), the jet engine modulation signals 10 having a frequency lower than the real doppler frequency and given by equations (2)–(5), the main beam clutter 7 and the side lobe clutters 8.

Receiving the signal from the antenna, the exciter-receiver amplifies the signal in a low noise condition, converts the amplified signal to an intermediate frequency signal by way of a local oscillation signal, eliminates the noises from the intermediate frequency signal, obtains doppler frequency signals in the video band by phase detection and converts the doppler frequency signals to digital signals. These digital signals are input to the signal processing unit which then eliminates the noises again and converts the noise-eliminated digital signals to narrow-band doppler frequency signals.

FIG. 4 shows changes with time in the frequency of the transmitted and received signals which are frequency-modulated for the purpose of measuring the range. In the figure, the reference numeral 11 designates a curve indicating changes in frequency of the transmitted signal; 12 a curve indicating changes in frequency of the target doppler frequency signal; and 13 curves indicating changes in frequency of the doppler frequency signals due to jet engine modulation. As shown in this figure, a plurality of doppler frequency signals are detected in FM phase C where the frequencies are constant and FM phases B and A where the linearly-changing-frequency modulation is effected. In FM phase C, four doppler frequency signals respectively having the frequencies $f_1$, $f_2$, $f_3$ and $f_4$ are received, and in FM phase B four doppler frequency signals are detected having the frequencies $g_1$, $g_2$, $g_3$ and $g_4$, respectively, which are frequency-shifted in accordance with the range to the target. Also in FM phase A four doppler frequency signals respectively having the frequencies $h_1$, $h_2$, $h_3$ and $h_4$ which are frequency-shifted in accordance with the range to the target are received.

The frequency of the target doppler signal is higher than the frequency of the transmitted signal by $f_1$ and is delayed by the time given in the following expression:

$$\tau = 2R/C_o \tag{6}$$

wherein R indicates the range to the target.

Similarly, the frequencies of the jet engine modulation signals are higher than the frequency of the transmitted signal by $f_2$, $f_3$ and $f_4$, respectively, and are delayed by $\tau$.

If one doppler frequency signal is received in each of FM phases C and B, the target range is calculated as follows using frequency $f_1$ detected in FM phase C and frequency $g_1$ detected in FM phase B:

$$f_1 - g_1 = \dot{F}\tau = \dot{F}\frac{2R}{C_0} \tag{7}$$

wherein F indicates the degree of frequency modulation in FM phase B. Then $$R = \frac{C_0}{2\dot{F}}(f_1 - g_1) \tag{8}$$

If, on the other hand, two doppler frequency signals are received in each of FM phases C and B, the problem is that four range values are obtained because four frequency differences are obtained. In order to overcome this problem the conventional radar system employs an additional FM phase A in which the degree of frequency modulation is different from that of FM phases B and C, and three-phase ranging is effected to obtain the range to the target.

In a case where, as shown in FIG. 4, three doppler frequency signals or more are received in each FM phase, it is impossible to obtain the real range value even if three FM phases are used.

Thus the calculation by equation (8) is done using FM phases C and B in the case of one doppler frequency signal being received in each FM phase, and using FM phases C, B and A in the case of two doppler frequency signals being received in each of FM phases C and B.

In a case where three doppler frequency signals or more are received, there are a multiplicity of combinations of frequencies, as shown in FIG. 5. If N signals are received, there are N×N combinations of frequencies. Since the frequencies in FM phase B are always lower than those in FM phase C, the values of $R_{21}$, $R_{31}$, $R_{32}$, $R_{41}$, $R_{42}$ and $R_{43}$ are all negative and are thus excluded from the calculation. In reality, there are $(N+1) \times N \div 2$ range calculations. This forces the conventional radar system to decide that the calculation necessary for obtaining the real range value is impossible in this case. In other words, although there is only one target to be detected, the range calculation is determined to be impossible in a case where a plurality of doppler frequency signals are received due to jet engine modulation. This leads to a significant deterioration in the performance of radar systems.

SUMMARY OF THE INVENTION

The present invention has been achieved on the basis of a novel point of view which recognizes that the differences between the doppler frequencies due to jet engine modulation are substantially equal. Thus it is a general object of the invention to solve the problem described above which is inherent to the conventional radar system.

It is another object of the invention to provide a radar system capable of obtaining a value indicating the range to a target regardless of what that range is.

In order to achieve these objects, a radar system according to the present invention alternately generates a first signal which has a constant frequency and a second signal which is linearly-changing-frequency modulated, pulse-modulates these first and second signals at a predetermined pulse repetition rate and transmits the pulse-modulated signals from an antenna apparatus into the atmosphere. These pulse-modulated signals are reflected by a target and then received by the antenna apparatus.

The radar system according to the present invention comprises signal processing means for detecting doppler frequency signals included in the received echo signal in the period of transmission of the constant-frequency first signal and the period of transmission of the linearly-changing-frequency modulated second signal, respectively, and for calculating the value indicating the range to the target on the basis of the differences between the doppler frequencies obtained in each of these periods.

In a preferred embodiment of the present invention, when a plurality of doppler frequency signals are received in both of these transmission periods, the signal processing means calculates the possible range values on the basis of all the combinations of the plurality of doppler frequencies received in one of the transmission periods and those received in the other of the transmission periods, obtains the number of same range values on the basis of the above calculations, and decides the range value by adopting the largest number as the value indicating the range to the target.

In another preferred embodiment of the present invention, the signal processing means calculates the range values when a plurality of doppler frequency signals are received in both of the transmission periods by selectively using three-phase FM ranging, two-phase FM ranging employing signals having higher frequencies, or selection of the signal having the largest amplitude out of the doppler frequency signals received in each of the transmission periods in accordance with whether or not the frequency differences between the doppler frequency signals in each of the transmission periods are equal.

The results of the calculation conducted by the signal processing means are displayed on display means.

An advantage of the present invention is that, even when a multiplicity of doppler frequency signals caused by jet engine modulation which results from the rotation of jet engine blades are detected, a value indicating the range to a target can be obtained regardless of the jet engine modulation frequencies and the maximum range detection capacity of radar systems. This serves to avoid any deterioration in radar search performance.

BRIEF DESCRIPTION OF THE DRAWINGS:

Other features and advantages of the invention will be apparent from the following description taken in connection with the accompanying drawings wherein:

FIG. 9 is a block diagram showing the structure of a second embodiment of the radar system according to the present invention;

FIG. 10 shows combinations of frequencies for the range calculations conducted by the second embodiment.

DESCRIPTION OF THE PREFERRED EMBODIMENTS

The first embodiment of the radar system according to the present invention will be described below with reference to FIGS. 6-8.

Figure 6:
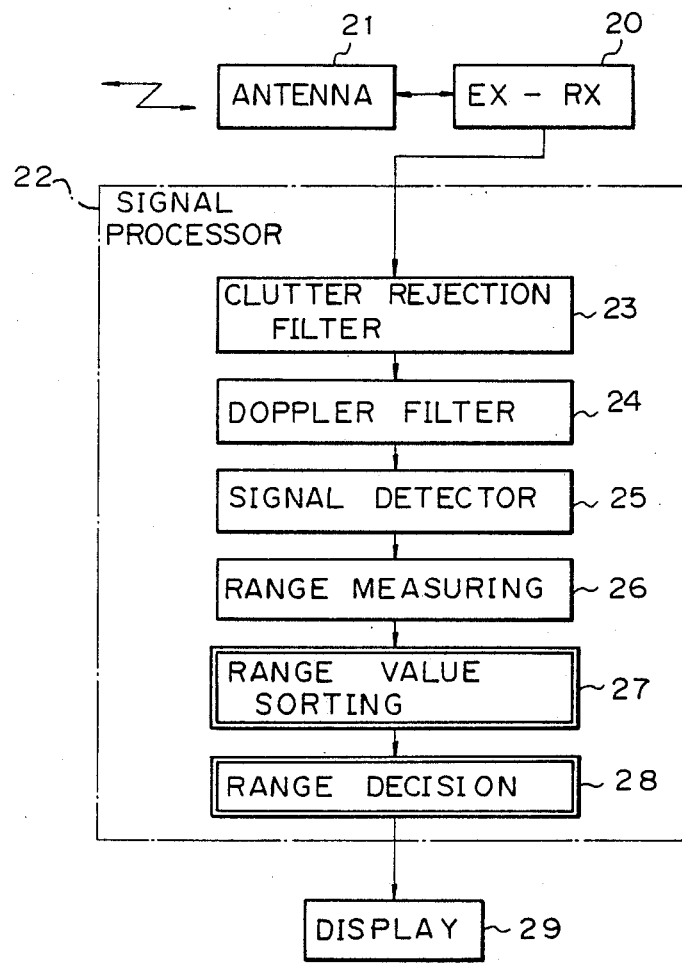
FIG. 6 is a block diagram showing the structure of a first embodiment of the radar system according to the present invention.

Referring to FIG. 6, exciter-receiver 20 alternately generates a constant-frequency signal and a linearly-changing-frequency modulated signal, and pulse-modulates these signals at a high pulse repetition rate for transmission purposes. Then exciter-receiver 20 receives an echo signal which in turn is amplified and converted to a digital signal after clutter noises have been eliminated from the amplified echo signal. When transmission is conducted, the output from exciter-receiver 20 is fed to antenna 21 which power-amplifies the transmission signal to transmit it into the atmosphere and receives an echo signal reflected from a target.

During reception, the digital signal from exciter-receiver 20 is supplied to signal processor 22 which effects various types of signal processing on the digital signal for the purpose of calculating a value indicating the range to the target. To this end, signal processor 22 comprises clutter rejection filter 23, doppler filter 24, signal detector 25, range measuring circuit 26, range value sorting circuit 27 and range decision circuit 28. The output from signal processor 22 is fed to display device 29 on which such information as the range to the target is displayed.

In operation, a transmission signal including a repetition of the alternately generated constant-frequency signal and linearly-changing-frequency modulated signal from exciter-receiver 20 are pulse-modulated at a high pulse repetition rate and transmitted from antenna 21. Antenna 21 amplifies these transmission signals so that they become high power signals and emits them from a multiplicity of antenna elements in a predetermined phase relationship to form antenna beams.

Figure 1:
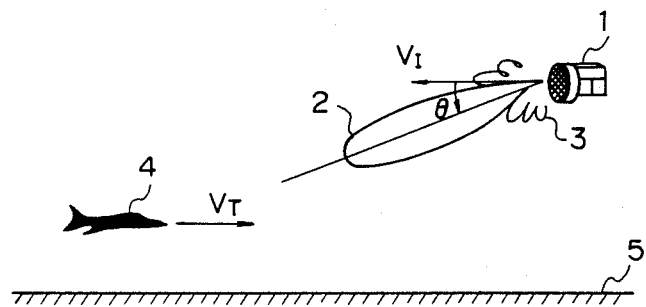
FIG. 1 schematically shows the relationship between a radar system mounted on an airplane and a target.
Figure 2:
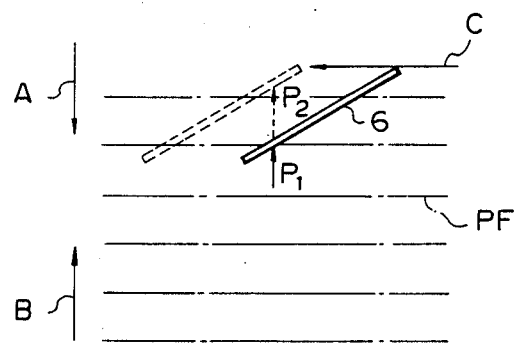
FIG. 2 is used to illustrate the doppler shift that occurs in the negative direction due to rotation of jet engine blades.
Figure 3:
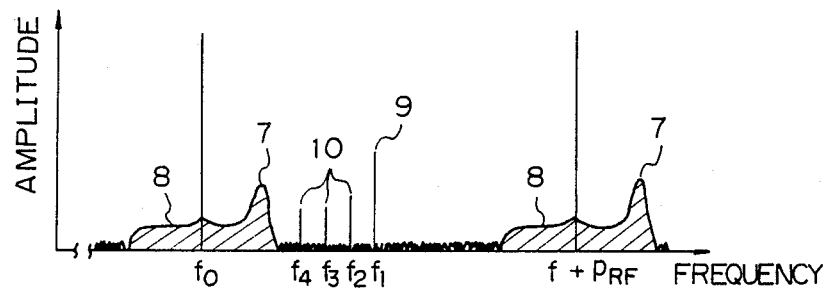
FIG. 3 shows an example of the frequency spectrum of an echo signal received by the radar system shown in FIG. 1.

The radar system electronically steers these beams so as to search for a target and receives an echo signal from the target along with unnecessary clutter noises when the radar system is searching for the target in the down-look condition, as described with reference to FIG. 1. The signal reflected from the target airplane includes a plurality of doppler frequencies due to rotation of the jet engine blades. As a result, the reflected signal and the clutter noises have a frequency spectrum similar to that shown in FIG. 3. Thus the echo signal received by antenna 21 includes a target doppler frequency signal determined by the range from a target and given by equation (1), jet engine modulation signals having frequencies lower than the frequency of the target doppler frequency signal and given by equations (2)–(5), main beam clutters and side lobe clutters.

The echo signal received by antenna 21 is fed to exciter-receiver 20, is amplified thereby in a low noise condition and is converted to an intermediate frequency signal by an intermediate frequency oscillator. This intermediate frequency signal is, after elimination of the clutter noises, subjected to phase-detection so as to obtain the doppler signals in the video band which in turn are converted to digital signals.

Figure 4:
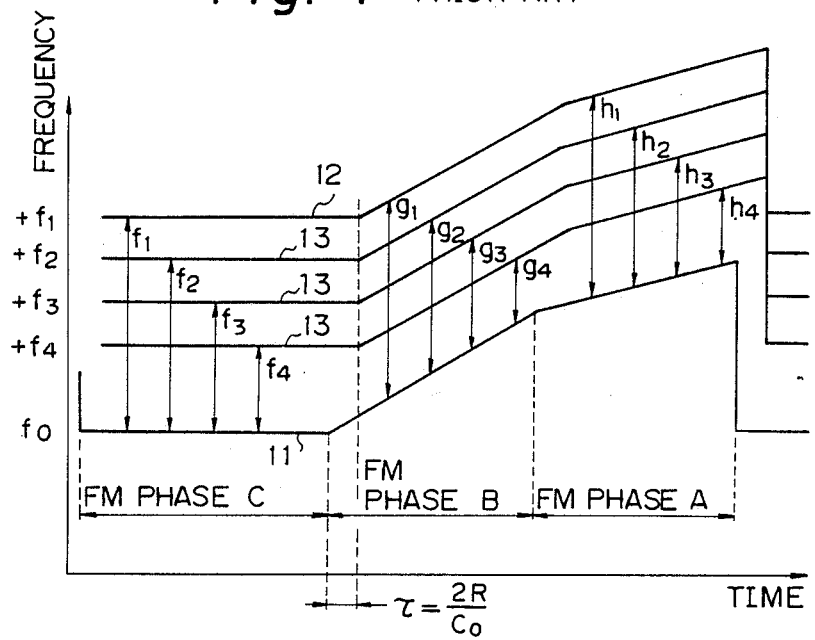
FIG. 4 shows changes with time of signals transmitted and received by the radar system shown in FIG. 1.
Figure 5:
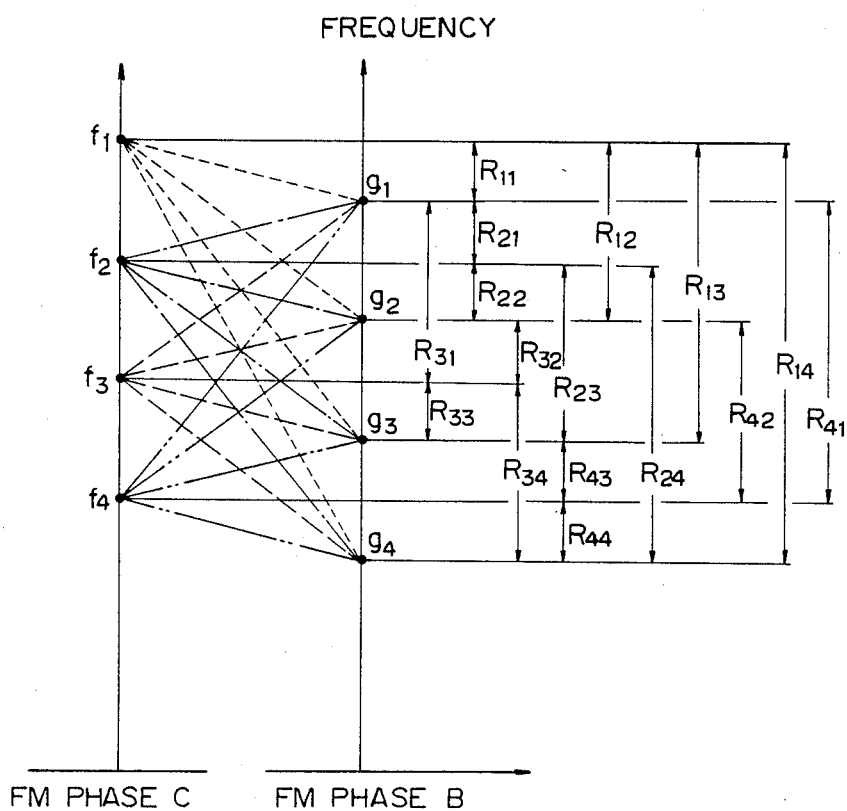
FIG. 5 shows combinations of frequencies on the basis of which distance values are calculated using the doppler frequency signals obtained in both FM phases.

These digital signals are fed to clutter rejection filter 23 which eliminates the clutter noises from the digital signals completely. The clutter-free digital signals are then subjected to fourier transform by doppler filter 24 to be converted to narrow band doppler frequency signals. These narrow band doppler frequency signals are fed to and amplitude-detected by signal detector 25 so as to be compared with the noise level and are finally detected as doppler frequency signals. It is to be noted that a plurality of doppler frequency signals may possibly be detected in FM phase C and in FM phase B, as described with reference to FIG. 4.

If only one doppler frequency signal is detected in each FM phase, range measuring circuit 26 obtains the target range value on the basis of the difference between frequency $f_1$ detected in FM phase C and frequency $g_1$ detected in FM phase B, in accordance with equation (7).

If two doppler frequency signals are detected in each FM phase, four range values are obtained by combining two doppler signals detected in FM phase C with two doppler signals detected in FM phase B.

In addition, if three or more doppler frequency signals detected in each FM phase, range measuring circuit 26 obtains the range values on the basis of all the combinations of frequencies using equations similar to equation (8).

Range value sorting circuit 27 sorts all the range values obtained by range measuring circuit 26 on the basis of amount, counts the number of the same range values, and outputs these range values according to the order of the numbers. In response to the output from range value sorting circuit 27, range decision circuit 28 operates to select a range value and decides whether this range value is valid with respect to the maximum range capacity of the radar system.

Figure 7A:
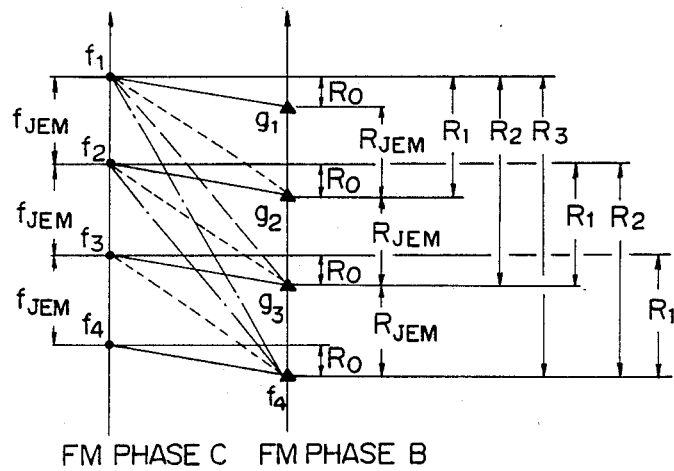
FIGS. 7A and 7B respectively show combinations of frequencies for the distance calculations conducted by the first embodiment.
Figure 7B:
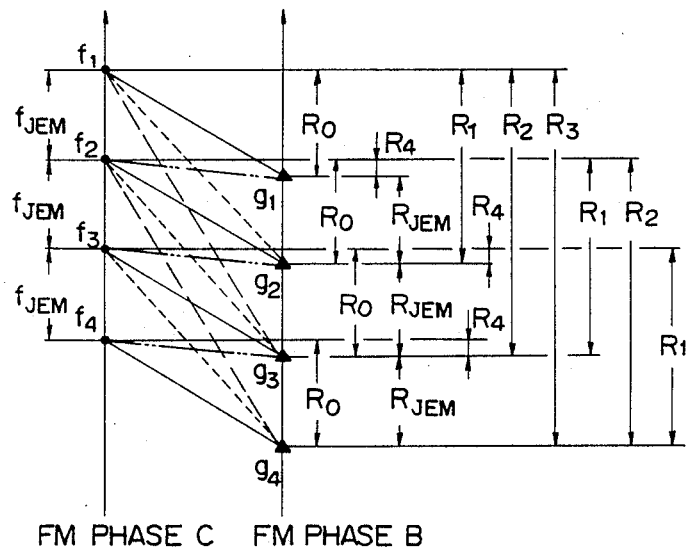
Figure 8:
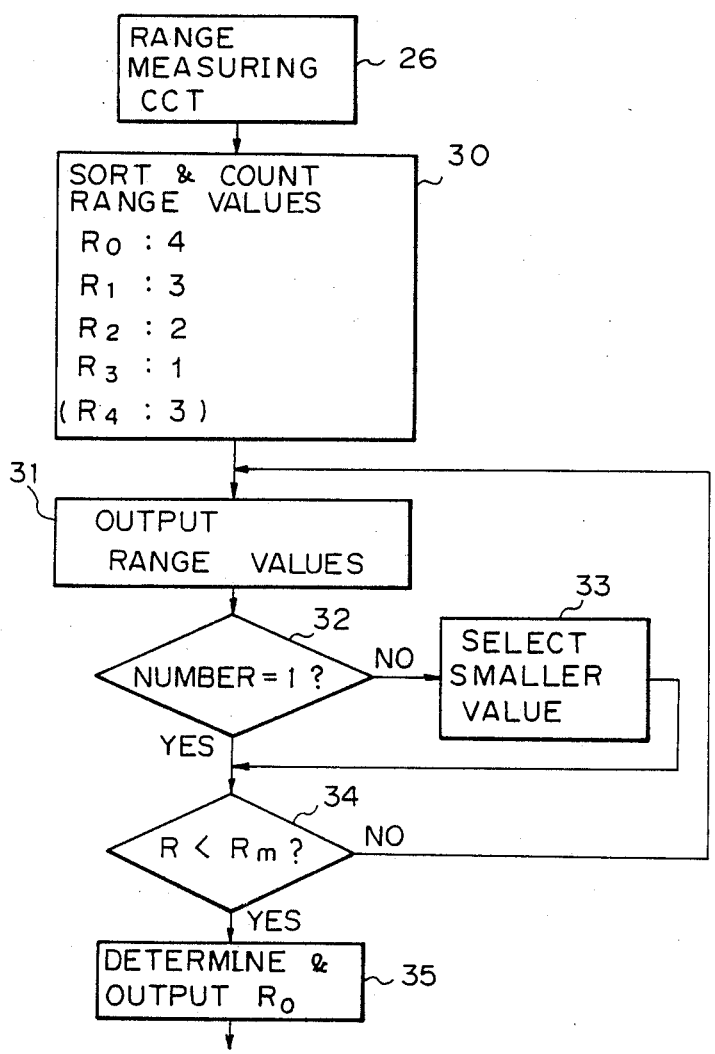
FIG. 8 is a flowchart for the range calculations conducted by the first embodiment.

FIGS. 7A and 7B shows the results of calculating the range values on the basis of all the combinations of frequencies by using four doppler frequency signals detected in each of two frequency modulation phases. The received jet engine modulation signals have frequencies lower than the real doppler frequency determined by the speed relative to the target, and the spacings between any two adjacent doppler frequencies in FM phases C and B are determined by the range to the target. Such frequency spacings are almost equal and designated by $f_{JEM}$. These facts are illustrated in FIGS. 7A and 7B.

In these figures, the reference symbol $f_1$ designates the real doppler frequency determined by the range to the target; and $f_2$, $f_3$ and $f_4$ the doppler frequencies due to jet engine modulation. Frequencies $f_1$-$f_4$ are received in FM phase C. On the other hand, frequencies $g_1$-$g_4$ are received in FM phase B, wherein the reference symbol $g_1$ designates the real doppler frequency and $g_2$-$g_4$ doppler frequencies due to jet engine modulation. Frequency $g_1$ is lower than frequency $f_1$ by the amount $\dot{F} \cdot 2R/C_o$ shown in equation (7). The spacings between frequencies $f_1$-$f_4$ and between $g_1$-$g_4$ are equal to the above stated spacing $f_{JEM}$. Taking into consideration the fact that the frequencies in FM phase B are always lower than the corresponding frequencies in FM phase C, it is possible to exclude those frequency differences which have negative values. Accordingly, the number of possible frequency differences is ten, i.e., $(4+3+2+1)$ in the case shown in FIGS. 7A, and thirteen, i.e. $(4+3+2+1+3)$ in the case shown in FIG. 7B. The real range value to be obtained in the present invention is $R_o$ determined by the following calculation:

$$R_0 = (f_1 - g_1)\frac{C_0}{2\dot{F}} \quad (9)$$

False range values $R_1$, $R_2$, $R_3$ and $R_4$ are determined by the following equations:

$$R_1 = R_0 + (g_1 - g_2)\frac{C_0}{2\dot{F}} = R_0 + (g_2 - g_3)\frac{C_0}{2\dot{F}} \quad (10)$$
$$= R_0 + (g_3 - g_4)\frac{C_0}{2\dot{F}} = R_0 + R_{JEM}$$

$$R_2 = R_0 + (g_1 - g_3)\frac{C_0}{2\dot{F}} = R_0 + (g_2 - g_4)\frac{C_0}{2\dot{F}} \quad (11)$$
$$= R_0 + 2R_{JEM}$$

$$R_3 = R_0 + (g_1 - g_4)\frac{C_0}{2\dot{F}} = R_0 + 3R_{JEM} \quad (12)$$

wherein $R_{JEM} = f_{JEM} C_o/2\dot{F}$

FIG. 7B shows a case where $(f_1 - g_1)$ becomes larger than $f_{JEM}$. Range value $R_4$ is expressed by the following equation:

$$R_4 = R_o - R_{JEM} \quad (14)$$

In the case where the maximum range capacity of the radar Rm is always smaller than $R_{JEM}$, since the combinations of range calculations can be shown in FIG. 7A, the following holds good:

$$R_1, R_2, R_3 > R_{JEM} > Rm \quad (15)$$

Accordingly, it is possible to obtain the real range value $R_o$ by selecting the smallest of the results of the calculations. In other words, the real range value is obtainable when frequency difference $f_{JEM}$ and range value $R_{JEM}$ determined by difference $f_{JEM}$ are known and the maximum range capacity of the radar satisfies equation (13). However, the jet engine modulation frequencies from a target airplane are usually unknown. Moreover, if maximum range capacity of a radar Rm is larger than $R_{JEM}$, false range value $R_4$ as shown in FIG. 7B is also obtained from equation (14).

The present invention employs a method by which the number of the same range value is counted to obtain a range corresponding to the largest number in order to determine the real range-to-the-target value regardless of the jet engine modulation frequencies and the maximum range capacity of the radar being employed. Considering the example given in FIG. 7A, range value $R_o$ is obtained from the calculation using four combinations of frequencies, that is, $f_1$ and $g_1$, $f_2$ and $g_2$, $f_3$ and $g_3$, and $f_4$ and $g_4$. This means that four different calculations give the same range value $R_o$. Since this number, four, is the largest in this case and the number of other frequency combinations is three or less, range value $R_o$ is determined to be real. If no signal having frequency $g_1$ is received in FM phase B, the real range value $R_o$ and one of the false range values $R_1$ are respectively obtained from three different calculations. In such a case, a smaller range value should be selected as the real range value. Thus range value $R_o$ is determined to be real. The above stated matters hold good with the example given in FIG. 7B.

All the range values obtained by range measuring circuit 26 are input to range sorting circuit 27. Referring to FIG. 8 showing a range calculation flowchart, the operations of range value sorting circuit 27 and range decision circuit 28 of signal processor 22 will be explained hereinafter.

In step 30, range sorting circuit 27 counts the respective numbers of the same range values and in step 31 outputs the range values corresponding to the largest number. Since there are some cases where two or more same range values are output from range value sorting circuit 27, range decision circuit 28, receiving those range values from range value sorting circuit 27, determines in step 32 whether or not the number of range values output from circuit 27 is one. If NO, decision circuit 28 selects a smaller one in step 33 and the selected smaller range value R is compared with the maximum range capacity of the radar Rm in Step 34. If this comparison determines that R is valid with respect to Rm, range value R is determined to be real in step 35. If the selected value is not valid, range value sorting circuit 27 outputs the range value having the second largest number in step 31. These steps are repeated and range value sorting circuit 27 outputs the range value having the next largest number until a valid value is found in step 34. The range value thus determined in step 35 is fed to display device 29 and displayed thereon.

The operations of range value sorting circuit 27 and range decision circuit 28 will be explained in more detail with reference to FIG. 8 using the examples given in FIGS. 7A and 7B. In step 30, range value sorting circuit 27 sorts a plurality of range values given from range measuring circuit 26 on the basis of whether the range values are equal to one another, and counts the numbers of the same range values for all the range values. In this example, the results of this counting are four, three, two, one and three. Then in step 31, range value sorting circuit 27 outputs the range value corresponding to the largest number, i.e., four.

Range decision circuit 28 confirms that the number of range values output from circuit 27 is one in step 32 and determines that range value $R_o$ is assumed to be the real range value. In step 34 range value $R_o$ is compared with the maximum range capacity of the radar Rm. If $R_o$ is smaller than Rm, $R_o$ is determined to be valid as the real range value in step 35 to be displayed on display device 29. If $R_o$ is larger than Rm, range value sorting circuit 27 outputs the range value corresponding to the second largest number in step 31 and processings similar to what is described above are repeated.

As already described, when range value sorting circuit finds that the number of range values $R_o$ and $R_1$ is three, range decision circuit 28 selects the smaller range value in step 33.

It is thus to be noted that the correct target range value can always be obtained without fail, regardless of the jet engine modulation frequencies and the maximum range capacity of a radar.

Now the second embodiment of a radar system according to the present invention will be described with reference to FIGS. 9-11.

FIG. 9 is a block diagram showing the structure of the second embodiment. In the figure the same reference numerals are used to designate elements that are similar to those in FIG. 6.

Compared with the first embodiment shown in FIG. 6, the second embodiment shown in FIG. 9 has no range value sorting circuit 27 and instead includes target number decision circuit 36, frequency spacing decision circuit 37 and maximum amplitude signal selecting circuit 38 between signal detector 25 and range measuring circuit 26.

In the second embodiment, target number decision circuit 36 in signal processor 22 receives the output from signal detector 25 and determines that the number of doppler frequency signals is one, two, three or more. When decision circuit 36 detects two or more doppler frequency signals, frequency spacing decision circuit 37 calculates the frequency spacings between any two adjacent signals from signal detector 25 and decides if these signals are subject to jet engine modulation. When three or more signals are detected and the frequency spacings are not equal, maximum amplitude signal selecting circuit 38 selects the signal having the maximum amplitude.

The operations of exciter-receiver 20, antenna 21, clutter rejection filter 23, doppler filter 24, signal detector 25 and range measuring circuit 27 are the same as those already described with reference to FIG. 6 and explanation thereof is omitted here for the sake of simplicity. The number and frequencies of the doppler frequency signals detected in FM phases C and B by signal detector 25 are fed to target number decision circuit 36. As already stated with reference to the first embodiment, the frequencies of these signals are lower than the real doppler frequency determined by the speed relative to the target, and the spacings $f_{JEM}$ between any two adjacent doppler frequencies are equal. Thus the differences in frequency between any two adjacent doppler frequencies due to jet engine modulation as received in the respective FM phases are determined by the range to the target and have almost the same values.

An example of the results of the range value calculations on the basis of all the combinations of four doppler frequency signals detected in each of FM phases C and B are shown in FIG. 10A. In this figure, the reference sign $f_1$ designates the real doppler frequency received in FM phase C and determined by the range to the target; $f_2$, $f_3$ and $f_4$ doppler frequencies due to jet engine modulation as received in FM phase C; $g_1$ the real doppler frequency received in FM phase B; and $g_2$, $g_3$ and $g_4$ doppler frequencies due to jet engine modulation as received in FM phase B.

Frequency $g_1$ is lower than frequency $f_1$ by the amount $(F \cdot 2R/C_o)$ as shown in equation (7), and the spacings between any two adjacent frequencies of $f_1-f_4$ and of $g_1-g_4$ have the same value $f_{JEM}$. Accordingly, the doppler frequencies received in FM phases B and A are lower than those received in FM phase C, and the doppler frequencies received in FM phase A are higher than those received in FM phase B. This means that it is permissible to omit the negative frequency differences between the doppler frequencies in FM phase C and those in FM phases B and A and to omit the positive frequency differences between the doppler frequencies in FM phase B and those in FM phase A. As a result, the number of the combinations of doppler frequencies is ten $(=4+3+2+1)$ in the case shown in FIG. 10A.

FIG. 10B shows another example of the results of range value calculations on the basis of all the combinations of three doppler frequency signals detected in each of FM phases C and B. In this example, the number of doppler frequency signals in FM phases C and B is the same, but $f_2$ and $g_3$ are not received. This may happen when the transmission level is relatively low so that some of the frequency components of the echo signal are not received in such a manner as to be clearly distinguishable from noises. Accordingly, the frequency spacings between any two adjacent doppler frequency signals detected in the respective FM phases are not equal, and there are five possible combinations of doppler frequencies.

The real range value is obtained from the following equation:

$$R_0 = (f_1 - g_1)\frac{C_0}{2F} \quad (9)$$

FIG. 10C shows the relative amplitudes of the doppler frequency signals detected in the case of FIG. 10B. Usually the real doppler frequency signals are always detected and have the largest amplitude.

As will be clear from the above descriptions, in order to overcome the problem of the prior art radar system and calculate the real correct range value, the second embodiment shown in FIG. 9 utilizes the fact that the frequency spacing between any adjacent two jet engine modulation signals is equal, and that the amplitude of the real doppler signal is the largest, thus enabling the radar system of the second embodiment to obtain the real correct range value.

Figure 11:
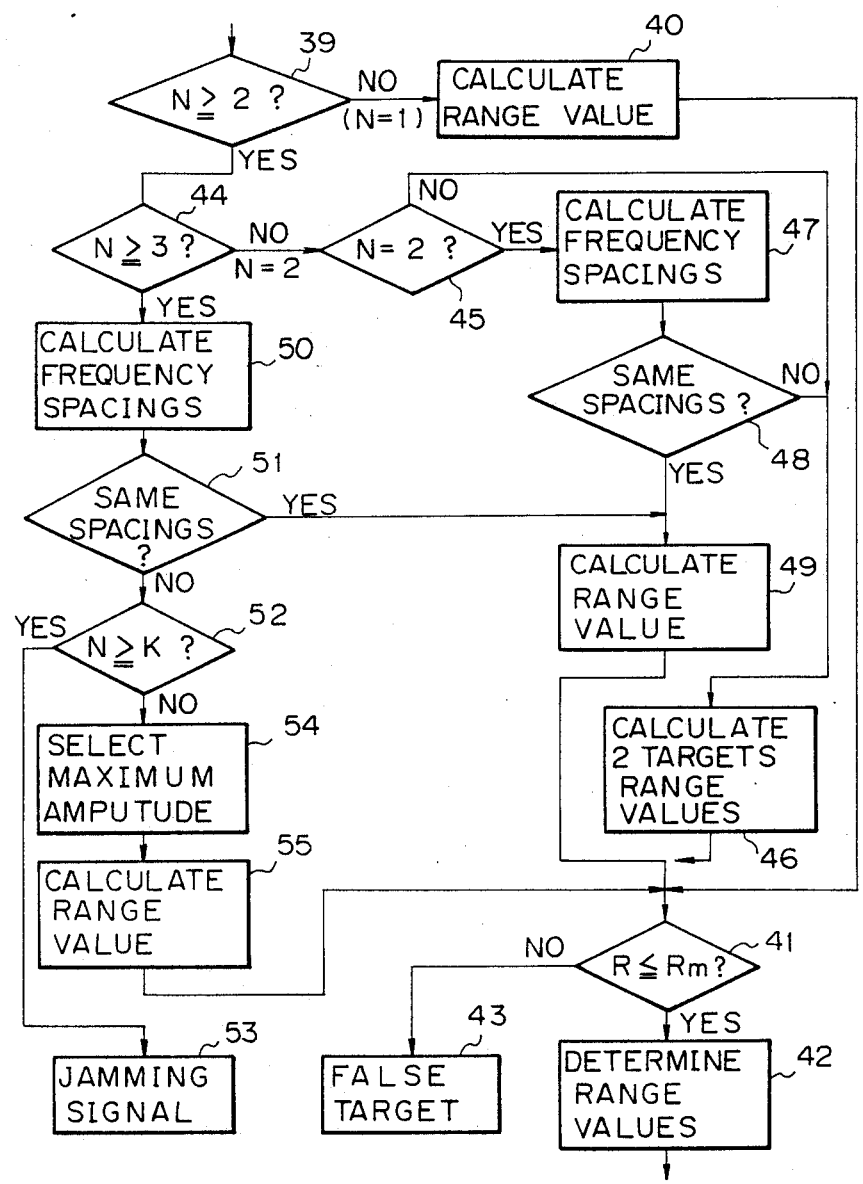
FIG. 11 is a flowchart for the range calculations conducted by the second embodiment.

FIG. 11 shows a flowchart for range value calculation effected in target number decision circuit 36, frequency spacing decision circuit 37 and maximum amplitude signal selecting circuit 38. The operations of these circuits as well as range measuring circuit 26 and range decision circuit 28 will not be explained with reference to this flowchart.

Target number decision circuit 36 decides in step 39 whether or not the number of signals detected in FM phases C and B is two or more. If the answer in step 39 is NO, range measuring circuit 26 calculates the range values on the basis of the combinations of the doppler frequency signal received in FM phase C and that received in FM phase B, in step 40. The calculated range value is sent to range decision circuit 28 and compared with maximum range capacity Rm in step 41. If calculated range value R is less than Rm, this value is determined to be valid in Step 42 and is sent to display device 29. If the calculated range value is larger than Rm, this value is decided to be false in step 43 and is ignored accordingly.

If the number of doppler frequency signals detected in each FM phase is two or more, step 44 determines if the number of signals is three or more. If the number is two, step 45 decides if the number of doppler signals detected in both FM phases C and B is two. If the number of signals received in one of these FM phases is two and the number of signals received in the other of these FM phases is one, the two-target range calculation using FM phases C, B and A is effected in step 46. The calculated results are sent to range decision circuit 28 and is similarly processed.

If two doppler frequency signals are received in both FM phases C and B, frequency spacing decision circuit 37 obtains the frequency spacings between two signals received in each of FM phases C, B and A in step 47. Then step 48 decides if these frequency differences have the same value. If NO, steps 46, 41, 42 and 43 are effected. If YES, the received signals can be considered as jet engine modulation signals. Then step 49 selects the signals having higher frequencies in FM phases C and B in order to obtain the real doppler frequencies $f_1$ and $g_1$ as shown in FIG. 10A and calculates the range value by using $f_1$ and $g_1$. The calculated result is processed similarly in steps 41, 42 and 43.

In step 44, the number of doppler frequency signals is determined to be three or more, and frequency spacing decision circuit 37 obtains the frequency spacings between the adjacent signals received in the respective FM phases C and B and in step 50. Then step 51 determines if these frequency spacings are the same. If YES, the signals having higher frequencies (that is, the real doppler frequencies) are selected to allow calculation of the real range value in step 49 since these received signals are considered to be the doppler signals derived from jet engine modulation. If step 51 determines that the frequency spacings are unequal, step 52 determines if the number of signals is equal to or more than K, which is somewhat larger than the number of possible jet engine modulation signals. If YES, these received signals are considered to be jamming waves in step 53 and the jamming signal marker and its angular information are displayed in display device 29. If the answer in step 52 is NO, this suggests that some of the jet engine modulation signals have not been detected due to their levels being below the noise level, as shown in FIG. 10B, or that three or more target airplanes moving at different speeds and at different ranges are positioned in the line of the same antenna beam. The conventional three-phase range measuring method cannot provide any solution in such cases.

In order to overcome this problem, the present invention proposes a new method of selecting the maximum amplitude signals in each of FM phases C and B in step 54. The selected signals are utilized for calculating the range value in step 55. This range value is compared with Rm in step 41 to determine whether this value is real. Thus the real doppler signals and, accordingly, the real range value are obtained. Even if three or more targets are detected by the radar system, the most threatening target is the one positioned nearest to the radar system. This target produces doppler signals having the largest amplitude, which makes the range value calculation possible.

It should be noted from the foregoing that the present invention enables a real range value to be obtained consistently regardless of the presence of jet engine modulation frequencies and of the target range.

The invention has been described in detail with particular reference to preferred embodiments thereof, but it will be understood that variations and modifications can be effected within the spirit and scope of the invention. For example, both embodiments employ radar systems having antennas which electronically steer the beams. The present invention is not limited to use of such an antenna, and is applicable to radar systems using any type of antenna or transmitter. Further, the signal processor can take the form of hardware or software.

What is claimed is:

1. A pulse doppler radar system for transmitting pulse-modulated signals from an antenna apparatus and for receiving an echo signal from a target through said antenna apparatus to measure the range to the target, comprising:

exciter-receiver means operable to alternately generate a first signal having a constant frequency in a first period and a second signal modulated with a linearly-changing frequency in a second period and to pulse-modulate said first and second signals at a predetermined pulse repetition rate so as to supply the pulse-modulated first and second signals to said antenna apparatus and for receiving an echo signal from said antenna apparatus, thereby enabling said antenna apparatus to alternately transmit the pulse-modulated first signal and the pulse-modulated second signal;

signal processing means coupled to said exciter-receiver means to detect doppler frequencies included in said echo signal received in said first period and doppler frequencies included in said echo signal received in said second period, respectively, for calculating the value indicating the range to said target on the basis of the differences between said doppler frequencies received in said first period and those received in said second period, said signal processing means being operable, when a plurality of doppler frequency signals are received in both of said first and second periods, to calculate the range values on the basis of all the differences between said plurality of doppler frequencies received in said first period and those received in said second period, thereby enabling the number of same range values to be obtained so that the range value corresponding to the largest number can be determined to be a value indicating the range to said target; and means for displaying the range of said target on the basis of the so determined range value.

2. Radar system according to claim 1 wherein said target is a jet plane and an echo signal from said jet plane is frequency-modulated by the rotation of the jet engine compressor blades of said jet plane.

3. Radar system according to claim 2 wherein said exciter-receiver means comprises means for converting the frequency of said echo signal, means for eliminating unnecessary signals from the frequency converted echo signal, means for phase-detecting the signal output from said means so as to eliminate unnecessary signals, and means for converting the phase-detected signal to a digital signal.

4. Radar system according to claim 3 wherein said signal processing means comprises:
  signal detecting means for comparing said digital signal with a noise signal to detect doppler frequency signals;
  range measuring means responsive to said doppler frequency signals to calculate all possible range values including a value indicating the range to said jet plane on the basis of the number of said doppler frequency signals detected in each of said first and second periods;
  range value sorting means responsive to said possible range values and adapted to sort these range values on the basis of amount and to count the number of same range values; and
  range decision means responsive to the results of the counting of the number of same range values to decide the value indicating the real range to said jet plane.

5. Radar system according to claim 4 wherein said signal processing means further includes first filtering means for eliminating clutter noises from said digital signals and second filtering means for effecting a fast fourier transform of said filtered digital signals to extract narrow band doppler frequency signals which are fed to said signal detecting means.

6. A method of measuring range to a target, comprising the steps of:
  alternately generating a first signal having a constant frequency in a first period and a second signal modulated by a linearly-changing frequency in a second period and pulse-modulating said first and second signals at a predetermined pulse repetition rate to transmit them from an antenna apparatus;
  receiving through said antenna apparatus an echo signal produced when said pulse-modulated first and second signals are reflected by said target, said echo signal being frequency modulated by said target;
  detecting doppler frequencies included in said echo signal in said first and second period;
  calculating the spacing between said doppler frequencies detected in said first period and between said doppler frequencies detected in said second period, respectively, when the number of doppler frequencies detected in each of said first and second periods is one;
  calculating the range values on the basis of the differences between said doppler frequencies detected in said first period and those detected in said second period when a plurality of doppler frequencies are detected in both said first and second periods, obtaining the number of same range values according to the results of calculating the frequency differences and determining a value indicating the range to said target by selecting the range value corresponding to the largest number of all; and
  displaying the range of said target on the basis of the determined value.

7. A pulse doppler radar system for transmitting pulse-modulated signals from an antenna apparatus and for receiving an echo signal from a target through said antenna apparatus to measure the range to the target, comprising:
  exciter-receiver means operable to alternately generate a first signal having a constant frequency in a first period and a second signal modulated by a linearly-changing frequency in a second period and to pulse-modulate said first and second signals at a predetermined pulse repetition rate so as to supply the pulse-modulated first and second signals to said antenna apparatus and for receiving said echo signal from said antenna apparatus, thereby enabling said antenna apparatus to alternately transmit and pulse-modulated first signal and the pulse-modulated second signal;
  signal processing means coupled to said exciter-receiver means to detect doppler frequencies included in said echo signal received in said first period and doppler frequencies included in said echo signal received in said second period, respectively, for calculating a value indicating the range to said target on the basis of the differences between said doppler frequencies detected in said first period and those detected in said second period, said signal processing means being operable, when a plurality of doppler frequency signals are received in both of said first and second periods, to calculate the value indicating the range to said target by selectively using three phase FM ranging or two phase FM ranging which employs doppler frequency signals having the highest frequencies and selection of the doppler frequency signal having the maximum amplitude out of said doppler frequency signals received in each of said first and second periods in accordance with whether the spacings between said doppler frequencies received in each of said first and second periods are equal or not; and
  means for displaying the range of said target in response to the results of the range calculations.

8. Radar system according to claim 7 wherein said target is a jet plane and an echo signal from said jet plane is frequency-modulated by the rotation of the jet engine compressor blades of said jet plane.

9. Radar system according to claim 8 wherein said exciter-receiver means comprises means for converting the frequency of said echo signal, means for eliminating noise signals from said frequency converted echo signal, means for phase-detecting the noise eliminated signal and means for converting the phase-detected signal to a digital signal.

10. Radar system according to claim 9 wherein said signal processing means comprises:
  signal detecting means operable to compare said digital signal with a noise signal to detect doppler frequency signals;
  first decision means for deciding the number of said doppler frequency signals detected in each of said first and second periods;
  second decision means coupled to said first decision means and adapted to decide if the frequency spacings between the doppler frequency signals received in each of said first and second periods are the same when two or more doppler frequency signals are received in both of said first and second periods; and range measuring means coupled to said first and second decision means for calculating a value indicating the range to said jet plane (1) by using the frequency difference between doppler frequency signals when one doppler frequency signal is detected in each of said first and second periods, (2), by the frequency difference between doppler frequency signals having the highest frequencies when two or more doppler frequency signals are detected and the frequency spacings between said two or more doppler frequency signals detected in each of said first and second periods are the same, (3) by obtaining two difference values and selecting one of them when two doppler frequency signals are received in each of said first and second periods and the frequency spacing between said two doppler frequency signals received in said first period is unequal to the frequency spacing between said two doppler frequency signals received in said second period, and (4) by using the doppler frequency signals having the maximum amplitude when three or more doppler frequency signals are received in each of said first and second periods and the frequency spacings between said three or more doppler frequency signals received in said first period is unequal to the frequency spacings between said three or more doppler frequency signals received in said second period.

11. Radar system according to claim 10 wherein said signal processing means further includes first filtering means for eliminating clutter noises from said digital signal and second filtering means for effecting a fast fourier transform of said filtered digital signal to extract narrow band doppler frequency signals which are fed to said signal detecting means.

12. A method of measuring range to a target, comprising the steps of:

alternately generating a first signal having a constant frequency in a first period and a second signal modulated by a linearly-changing frequency in a second period and pulse-modulating said first and second signals by a pulse having predetermined pulse width and repetition rate to transmit them from an antenna apparatus;

receiving through said antenna apparatus an echo signal produced when said pulse-modulated first and second signals are reflected by said target, said echo signal being frequency-modulated by said target;

detecting doppler frequency signals included in said echo signal in each of said first and second periods;

calculating, when one doppler frequency signal is detected in each of said first and second periods, the frequency difference between the doppler frequency signal detected in said first period and the doppler frequency signal detected in said second period to obtain the range to said target;

calculating a value indicating the range to said target when a plurality of doppler frequency signals are detected in each of said first and second periods by selectively using three phase FM ranging or two phase FM ranging which employs doppler frequency signals having the highest frequencies and selection of the doppler frequency signal having the maximum amplitude out of said doppler frequency signals received in each of said first and second periods in accordance with whether the frequency spacings between said doppler frequency signals received in each of said first and second periods are equal or not; and displaying the range of said target on the basis of the calculated value.

* * * * *

UNITED STATES PATENT AND TRADEMARK OFFICE
CERTIFICATE OF CORRECTION

PATENT NO. : 4,920,347
DATED : April 24, 1990
INVENTOR(S) : Noboru Kurihara

It is certified that error appears in the above-identified patent and that said Letters Patent is hereby corrected as shown below:

On the title page, item [30], under the Foreign Application Priority Data, please change the filing date of Japanese Patent Application Serial No. 63-167314 to the correct filing date of July 5, 1988(JP).

Signed and Sealed this

Twenty-eighth Day of May, 1991

*Attest:*

HARRY F. MANBECK, JR.

*Attesting Officer*    *Commissioner of Patents and Trademarks*